(12) United States Patent
Shimizu

(10) Patent No.: US 6,502,217 B1
(45) Date of Patent: Dec. 31, 2002

(54) METHOD AND APPARATUS FOR RANDOMIZING SECTOR ADDRESSES IN A DISK STORAGE DEVICE

(75) Inventor: Kazushi Shimizu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/361,628

(22) Filed: Jul. 27, 1999

(30) Foreign Application Priority Data

Jul. 27, 1998 (JP) .......................................... 10-211108

(51) Int. Cl.$^7$ ............................................. H03M 13/00
(52) U.S. Cl. ...................................... 714/761; 714/769
(58) Field of Search ................................ 714/761, 769, 714/806, 768; 360/53, 77.07, 78.04; 369/60

(56) References Cited

U.S. PATENT DOCUMENTS

| | | | |
|---|---|---|---|
| 4,516,177 A | * 5/1985 | Moon et al. | ............. 360/77.07 |
| 4,993,029 A | 2/1991 | Galbraith et al. | ........... 714/769 |
| 5,712,863 A | 1/1998 | Gray | .......................... 714/806 |
| 5,717,535 A | 2/1998 | French et al. | .................. 360/53 |
| 5,793,724 A | * 8/1998 | Ichikawa et al. | ............. 369/60 |
| 5,822,142 A | * 10/1998 | Hicken | ......................... 360/53 |
| 5,889,796 A | * 3/1999 | Whaley | ....................... 714/769 |
| 6,038,096 A | * 3/2000 | Zhang et al. | ............ 360/78.04 |
| 6,052,817 A | * 4/2000 | Whaley | ....................... 714/769 |

* cited by examiner

*Primary Examiner*—David Ton
(74) *Attorney, Agent, or Firm*—Pillsbury Winthrop LLP

(57) ABSTRACT

Disclosed herein is a disk drive in which servo-sector addresses are reproduced from a disk, a target data sector to be accessed is specified, and data is read from or written in the target data sector. The servo-sector addresses are recorded on the disk and randomized in accordance with a specific translation rule, thus arranged in an order different from the order they should be arranged in the same cylinder. The disk drive has a read head and a CPU. The head reads the randomized servo-sector addresses from the disk. The CPU refers to a back translation table, translating the servo-sector addresses back to the original servo-sector addresses. The CPU then checks the continuity of each servo-sector address with respect to the adjacent ones. If the servo-sector address has have no continuity, the CPU determines that the servo-sector address has an error.

12 Claims, 10 Drawing Sheets

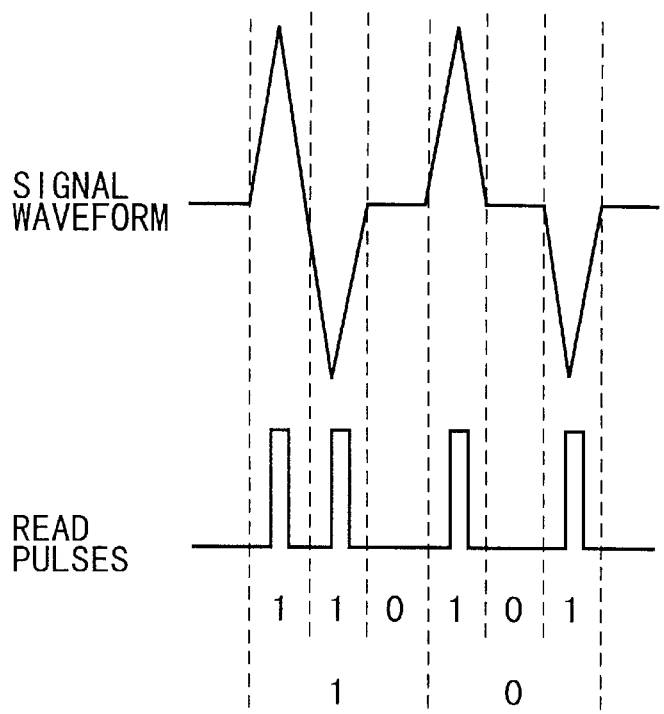

132

| ORIGINAL ADDRESS | | | TRANSLATED ADDRESS | | | CD1 | CD2 |
|---|---|---|---|---|---|---|---|
| | CODE (H) | CODE (B) | | CODE (H) | CODE (B) | | |
| 0 | 00 | 000000 | 34 | 22 | 100010 | 4 | 2 |
| 1 | 01 | 000001 | 56 | 38 | 111000 | 3 | 3 |
| 2 | 02 | 000010 | 16 | 10 | 010000 | 2 | 3 |
| 3 | 03 | 000011 | 42 | 2A | 101010 | 4 | 2 |
| 4 | 04 | 000100 | 6 | 06 | 000110 | 3 | 3 |
| 5 | 05 | 000101 | 17 | 11 | 010001 | 4 | 5 |
| 6 | 06 | 000110 | 10 | 0A | 001010 | 4 | 2 |
| 7 | 07 | 000111 | 57 | 39 | 111001 | 4 | 2 |
| 8 | 08 | 001000 | 31 | 1F | 011111 | 3 | 3 |
| 9 | 09 | 001001 | 55 | 37 | 110111 | 2 | 3 |
| 10 | 0A | 001010 | 38 | 26 | 100110 | 2 | 4 |
| 11 | 0B | 001011 | 5 | 05 | 000101 | 3 | 3 |
| 12 | 0C | 001100 | 49 | 31 | 110001 | 3 | 4 |
| 13 | 0D | 001101 | 12 | 0C | 001100 | 5 | 2 |
| 14 | 0E | 001110 | 50 | 32 | 110010 | 5 | 2 |
| 15 | 0F | 001111 | 43 | 2B | 101011 | 3 | 4 |
| 16 | 10 | 010000 | 46 | 2E | 101110 | 2 | 3 |
| 17 | 11 | 010001 | 61 | 3D | 111101 | 3 | 3 |
| 18 | 12 | 010010 | 18 | 12 | 010010 | 5 | 4 |
| 19 | 13 | 010011 | 3 | 03 | 000011 | 2 | 5 |
| 20 | 14 | 010100 | 0 | 00 | 000000 | 2 | 2 |
| 21 | 15 | 010101 | 41 | 29 | 101001 | 3 | 3 |
| 22 | 16 | 010110 | 51 | 33 | 110011 | 3 | 4 |
| 23 | 17 | 010111 | 8 | 08 | 001000 | 5 | 2 |
| 24 | 18 | 011000 | 63 | 3F | 111111 | 5 | 2 |
| 25 | 19 | 011001 | 21 | 15 | 010101 | 3 | 4 |
| 26 | 1A | 011010 | 32 | 20 | 100000 | 4 | 5 |
| 27 | 1B | 011011 | 25 | 19 | 011001 | 4 | 2 |
| 28 | 1C | 011100 | 60 | 3C | 111100 | 3 | 3 |

| ORIGINAL ADDRESS | | | TRANSLATED ADDRESS | | | CD1 | CD2 |
|---|---|---|---|---|---|---|---|
| | CODE (H) | CODE (B) | | CODE (H) | CODE (B) | | |
| 29 | 1D | 011101 | 4 | 04 | 000100 | 3 | 4 |
| 30 | 1E | 011110 | 15 | 0F | 001111 | 3 | 4 |
| 31 | 1F | 011111 | 52 | 34 | 110100 | 5 | 2 |
| 32 | 20 | 100000 | 33 | 21 | 100001 | 3 | 4 |
| 33 | 21 | 100001 | 24 | 18 | 011000 | 4 | 3 |
| 34 | 22 | 100010 | 44 | 2C | 101100 | 3 | 3 |
| 35 | 23 | 100011 | 13 | 0D | 001101 | 2 | 3 |
| 36 | 24 | 100100 | 23 | 17 | 010111 | 3 | 5 |
| 37 | 25 | 100101 | 2 | 02 | 000010 | 3 | 4 |
| 38 | 26 | 100110 | 37 | 25 | 100101 | 4 | 3 |
| 39 | 27 | 100111 | 27 | 1B | 011011 | 5 | 3 |
| 40 | 28 | 101000 | 22 | 16 | 010110 | 3 | 4 |
| 41 | 29 | 101001 | 62 | 3E | 111110 | 2 | 3 |
| 42 | 2A | 101010 | 40 | 28 | 101000 | 3 | 5 |
| 43 | 2B | 101011 | 20 | 14 | 010100 | 4 | 3 |
| 44 | 2C | 101100 | 9 | 09 | 001001 | 4 | 2 |
| 45 | 2D | 101101 | 39 | 27 | 100111 | 4 | 4 |
| 46 | 2E | 101110 | 29 | 1D | 011101 | 4 | 2 |
| 47 | 2F | 101111 | 58 | 3A | 111010 | 4 | 4 |
| 48 | 30 | 110000 | 1 | 01 | 000001 | 5 | 3 |
| 49 | 31 | 110001 | 36 | 24 | 100100 | 3 | 4 |
| 50 | 32 | 110010 | 35 | 23 | 100011 | 3 | 2 |
| 51 | 33 | 110011 | 45 | 2D | 101101 | 3 | 2 |
| 52 | 34 | 110100 | 14 | 0E | 001110 | 3 | 4 |
| 53 | 35 | 110101 | 11 | 0B | 001011 | 2 | 3 |
| 54 | 36 | 110110 | 54 | 36 | 110110 | 5 | 3 |
| 55 | 37 | 110111 | 30 | 1E | 011110 | 2 | 3 |

FIG. 7

| TRANSLATED ADDRESS | | | ORIGINAL ADDRESS | | |
|---|---|---|---|---|---|
| | CODE (H) | CODE (B) | | CODE (H) | CODE (B) |
| 0 | 00 | 000000 | 20 | 14 | 010100 |
| 1 | 01 | 000001 | 48 | 30 | 110000 |
| 2 | 02 | 000010 | 37 | 25 | 100101 |
| 3 | 03 | 000011 | 19 | 13 | 010011 |
| 4 | 04 | 000100 | 29 | 1D | 011101 |
| 5 | 05 | 000101 | 11 | 0B | 001011 |
| 6 | 06 | 000110 | 4 | 04 | 000100 |
| 8 | 08 | 001000 | 23 | 17 | 010111 |
| 9 | 09 | 001001 | 44 | 2C | 101100 |
| 10 | 0A | 001010 | 6 | 06 | 000110 |
| 11 | 0B | 001011 | 53 | 35 | 110101 |
| 12 | 0C | 001100 | 13 | 0D | 001101 |
| 13 | 0D | 001101 | 35 | 23 | 100011 |
| 14 | 0E | 001110 | 52 | 34 | 110100 |
| 15 | 0F | 001111 | 30 | 1E | 011110 |
| 16 | 10 | 010000 | 2 | 02 | 000010 |
| 17 | 11 | 010001 | 5 | 05 | 000101 |
| 18 | 12 | 010010 | 18 | 12 | 010010 |
| 20 | 14 | 010100 | 43 | 2B | 101011 |
| 21 | 15 | 010101 | 25 | 19 | 011001 |
| 22 | 16 | 010110 | 40 | 28 | 101000 |
| 23 | 17 | 010111 | 36 | 24 | 100100 |
| 24 | 18 | 011000 | 33 | 21 | 100001 |
| 25 | 19 | 011001 | 27 | 1B | 011011 |
| 27 | 1B | 011011 | 39 | 27 | 100111 |
| 29 | 1D | 011101 | 46 | 2E | 101110 |
| 30 | 1E | 011110 | 55 | 37 | 110111 |
| 31 | 1F | 011111 | 8 | 08 | 001000 |

| TRANSLATED ADDRESS | | | ORIGINAL ADDRESS | | |
|---|---|---|---|---|---|
| | CODE (H) | CODE (B) | | CODE (H) | CODE (B) |
| 32 | 20 | 100000 | 26 | 1A | 011010 |
| 33 | 21 | 100001 | 32 | 20 | 100000 |
| 34 | 22 | 100010 | 0 | 00 | 000000 |
| 35 | 23 | 100011 | 50 | 32 | 110010 |
| 36 | 24 | 100100 | 49 | 31 | 110001 |
| 37 | 25 | 100101 | 38 | 26 | 100110 |
| 38 | 26 | 100110 | 10 | 0A | 001010 |
| 39 | 27 | 100111 | 45 | 2D | 101101 |
| 40 | 28 | 101000 | 42 | 2A | 101010 |
| 41 | 29 | 101001 | 21 | 15 | 010101 |
| 42 | 2A | 101010 | 3 | 03 | 000011 |
| 43 | 2B | 101011 | 15 | 0F | 001111 |
| 44 | 2C | 101100 | 34 | 22 | 100010 |
| 45 | 2D | 101101 | 50 | 33 | 110011 |
| 46 | 2E | 101110 | 16 | 10 | 010000 |
| 49 | 31 | 110001 | 12 | 0C | 001100 |
| 50 | 32 | 110010 | 14 | 0E | 001110 |
| 51 | 33 | 110011 | 22 | 16 | 010110 |
| 52 | 34 | 110100 | 31 | 1F | 011111 |
| 54 | 36 | 110110 | 54 | 36 | 110110 |
| 55 | 37 | 110111 | 9 | 09 | 001001 |
| 56 | 38 | 111000 | 1 | 01 | 000001 |
| 57 | 39 | 111001 | 7 | 07 | 000111 |
| 58 | 3A | 111010 | 47 | 2F | 101111 |
| 60 | 3C | 111100 | 28 | 1C | 011100 |
| 61 | 3D | 111101 | 17 | 11 | 010001 |
| 62 | 3E | 111110 | 41 | 29 | 101001 |
| 63 | 3F | 111111 | 24 | 18 | 011000 |

FIG. 9

FIG. 10A  FIG. 10B  FIG. 10C  FIG. 10D ent invention relates to a method of manufactur-
METHOD AND APPARATUS FOR RANDOMIZING SECTOR ADDRESSES IN A DISK STORAGE DEVICE

BACKGROUND OF THE INVENTION

The present invention relates to a method of manufacturing a system for randomizing sector addresses, which is designed for use in, particularly, a hard disk drive and which efficiently detect errors in servo-sector addresses for identifying the servo sectors provided on a disk.

A hard disk drive (HDD) has a plurality of disks used as data storage media. A number of concentric tracks (also called "cylinders") are provided on each disk. Each track consists of sectors of two types, i.e., servo sectors and data sectors. On the servo sectors, servo data is recorded. On the data sectors, user data is recorded. The servo sectors are arranged in the track, equidistantly spaced part from one another. Each servo sector has two recording areas for recording a cylinder address and servo burst data. (The cylinder address is used to identify the track, and the servo burst data represents burst patterns.) The data sectors are provided among the servo sectors. More precisely, one data sector or a few data sectors are arranged between two adjacent servo sectors. Some of the data are divided, each into two or more sub-data sectors, each of which is arranged between two adjacent servo sectors.

The HDD has a head, which is moved to a target position (or a target cylinder) over the disk in accordance with the cylinder address and the servo burst data. Each servo sector has another area, in which the servo-sector address (also known as "sector address" for short) is recorded. After the head has been positioned at the target track, the servo-sector address is used to designate a target sector at which data accessing will be performed. Thus, on each disk, the data sectors take specific positions with respect to the servo sectors. In the HDD, each data sector is identified by decoding the sector address recorded in the servo sector that corresponds to the data sector.

The servo data including the sector address is reproduced from a read signal read by the head. (The head is a read head which is either an MR head or a GMR head.) The servo data may not be reproduced correctly if the read signal is superimposed with noise or the like. If the servo-sector, in particular, is not correctly produced, data accessing may be performed at a wrong data sector. This is why the HDD recently developed has the function of checking the continuity of servo-sector addresses to determine whether the servo-sector address read is correct or not. More specifically, to access the data sector having the servo-sector address "38," the HDD checks the servo-sector addresses "36," "37" and "38," one after another in the order mentioned. The use of any servo-sector address incorrectly reproduced due to the noise in the read signal supplied from the head is, therefore, prevented. The checking of the continuity of servo-sector addresses can effectively determine whether the servo-sector address read is correct or not, particularly when the noise influencing the serve-sector address is random noise.

One of the means used in the recent HDDs to accomplish high-density recording is a read/write head that has an MR (Magnetorisistive) head or a GMR (giant MR) head used as the read head. The read head can indeed excel in reproduction characteristic. However, as is known in the art, the magnetic sensitivity of its MR element abruptly changes, inevitably generating irregular noise called "Barkhausen noise," and the read signal, i.e., the output signal, will be superimposed with this noise.

Unlike random noise, this noise is generated, depending on the waveform of the read signal. That is, the noise appears at specific positions of the signal waveform, though not always. Hence, the checking of the continuity of servo-sector addresses, described above, cannot always determine whether the servo-sector address read is correct, when the noise influencing the servo-sector address is Barkhausen noise, not random noise.

Assume that each servo-sector address is a data pattern composed of six bits 0 to 5, and that Barkhausen noise regularly appears at bit 5, or a specific position in the data pattern. If this happens, the servo-sector addresses "3," "4" and "5" (or 000011, 000100 and 000101 in binary notation) will change to utterly different addresses "35," "36" and "37" (100011, 100100 and 100101), respectively. In other words, if a reading error is regularly made (in bit 5 only, in this instance), the checking of the continuity of servo-sector addresses can no longer determine whether the servo-sector address read is correct or not. As a consequence, the data to be recorded in the data sector having the sector address "38," for example, is inevitably recorded in the data sector having the sector address "6." In summary, a specific bit of each sector-sector address will change, causing reproducing errors, if noise such as Barkhausen noise regularly appears at the specific bit of the servo-sector address. It is therefore impossible to determine whether the servo-sector address read is correct even if the continuity of servo-sector addresses is checked, and data accessing is performed at a wrong data sector.

BRIEF SUMMARY OF THE INVENTION

The object of the present invention is to provide a disk drive in which it can be determined whether the servo-sector address read is correct, merely by checking the continuity of servo-sector addresses, even if an error may regularly occur at a specific one of the bits of each servo-sector address.

A disk driver according to the invention comprises: a disk on which a plurality of concentric cylinders are provided, each cylinder having servo sectors equidistantly arranged in circumferential direction of the cylinder, servo sectors including at least one data sector each and respectively having sector addresses recorded and randomized in accordance with specific translation rule; a head for reading the sector addresses from the servo sectors provided and reading and writing data from and in the data sectors; address generating means for translating the sector addresses read from the servo sectors by the head, back to the sector addresses specific to the servo sectors; and read/write means for designating a target servo sector by using the sector address of the target servo sector and causing the head to read and write data from and in the data sector provided in the target servo sector.

The sector addresses recorded on the same cylinder provided on the disk are translated to randomized ones, i.e., sector addresses that are not sequentially arranged in the initial order, in accordance with the prescribed rule. Thus, the servo-sector addresses have no continuity even if regular error occurs at a specific bit of each servo-sector address. The sector addresses arranged sequentially and reproduced from the disk differ from one another. Hence, the servo-sector addresses, back-translated by the address generating means, have no continuity. As a result, whether the reproduced sector addresses have an error or not can be reliably determined by checking the continuity of the back-translated sector addresses. In other words, the authenticity of the sector addresses can be determined. This prevents data from being recorded in a wrong data sector designated by an incorrect sector address.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a diagram depicting the waveform of the signal representing the address recorded in the sector area illustrated in FIG. 3;

FIG. 4B illustrates the read pulse that corresponds to the signal shown in FIG. 4A;

FIGS. 5A and 5B show the bit patterns of servo-sector addresses used in the disk drive;

FIG. 6 shows the first half of a sector-address translation table used in the disk drive;

FIG. 7 shows the latter half of the sector-address translation table used in the disk drive;

FIG. 8 shows the first half of another sector-address translation table used in the disk drive;

FIG. 9 shows the latter half of the other sector-address translation table;

FIGS. 10A to 10D are a diagram explaining the forward translation of servo-sector addresses and also the back translation thereof, both performed in the disk drive;

DETAILED DESCRIPTION OF THE INVENTION (Structure of the HDD)

Figure 1:
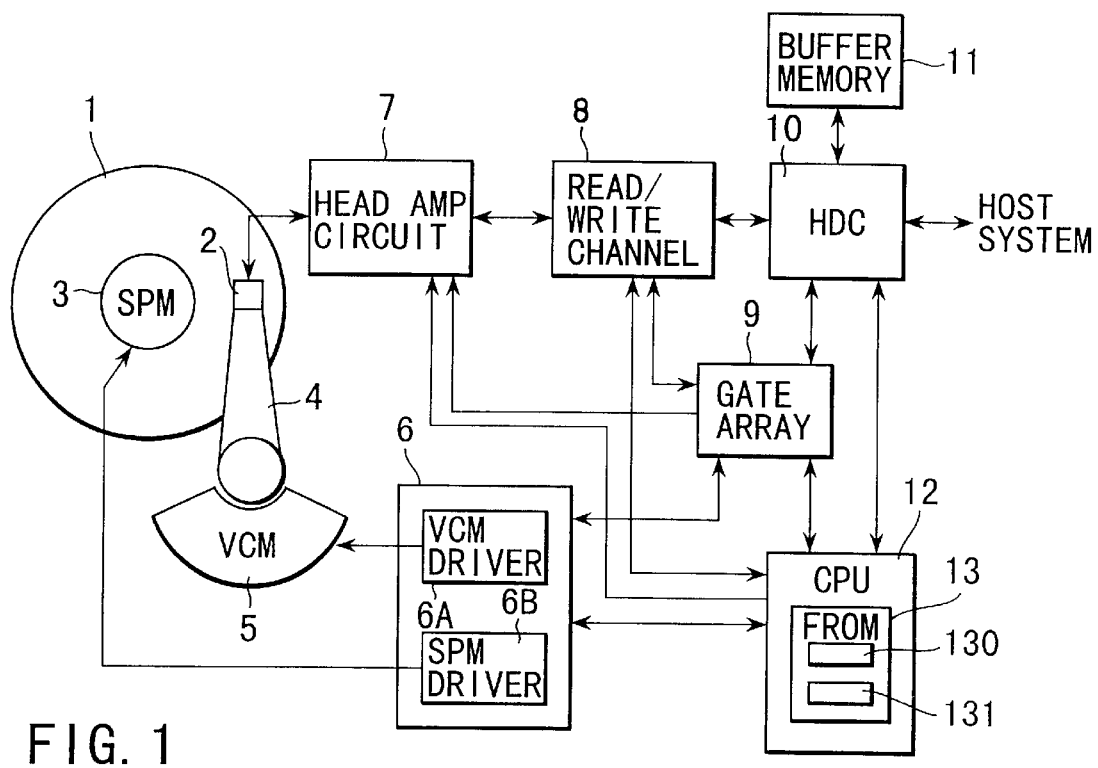
FIG. 1 is a block diagram showing the main components of a disk drive according to the invention.

FIG. 1 shows the main components of a disk drive according to the invention, which is a hard disk drive (HDD).

As shown in FIG. 1, the HDD has a disk 1 and two heads 2. The HDD has only one disk, for simplicity of explanation, though the HDD may have two or more disks as most HDDS. The heads 2 are provided at two surfaces of the disk 1, respectively. Each head 2 comprises a read head and a write head. The read head is an MR head (or a GMR head), while the write head is an inductive head. As is known in the art, the resistance of the MR head (i.e., the read head) changes with the intensity of the external magnetic field. When supplied with a prescribed bias current (sense current), the MR head detects a change in the magnetic field at the disk 1, thus reading the magnetic data (digital data) recorded on the disk 1, in the form of a voltage change.

Figure 2:
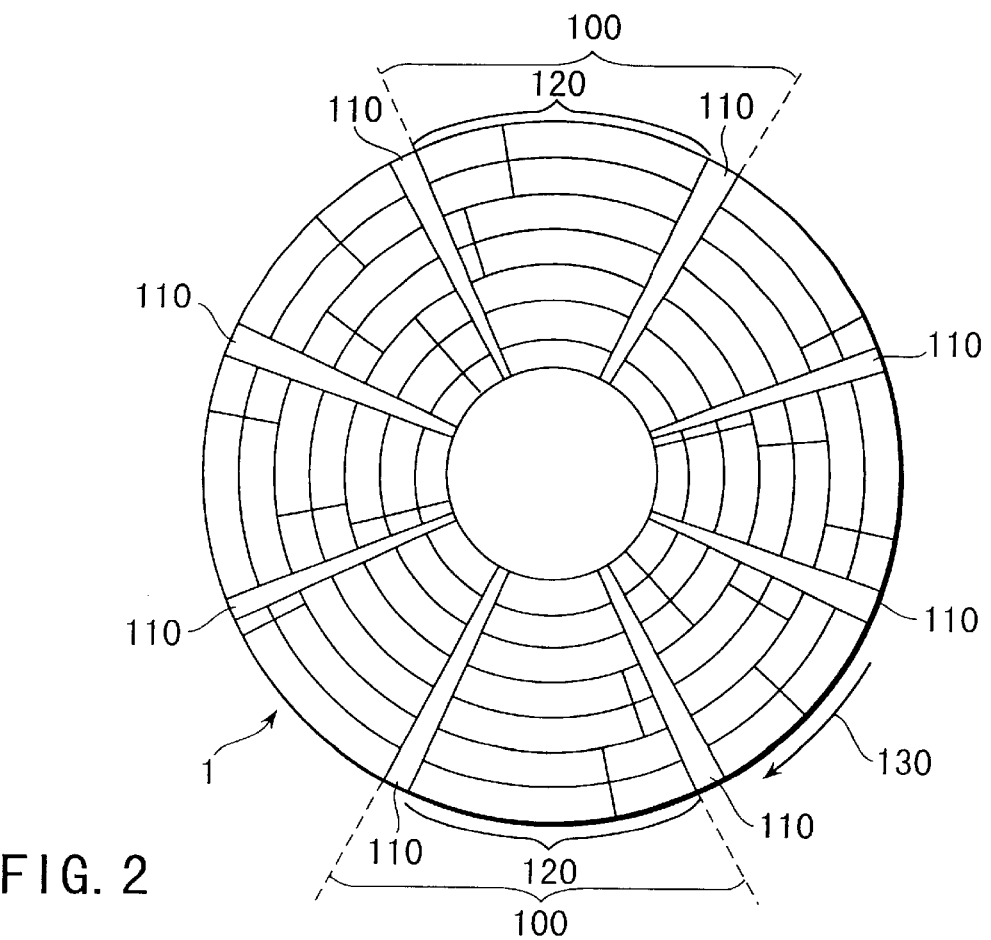
FIG. 2 is a diagram representing the format of the disk incorporated in the disk drive shown in FIG. 1.

Conceptually, a number of concentric tracks (cylinders) are provided on each surface of the disk 1 as is illustrated in FIG. 2. The tracks are divided into a plurality of servo sectors 100 having the same size, each including a data sector. Each servo sector 100 consists of a servo area 110 and a data-sector area 120. (The servo area 110 is also called "servo sector" in the narrow sense of the word.) Servo data is recorded in the servo area 110 and used to control the position the head 2 with respect to the disk 1. User data is recorded in the data-sector area 120. The data-sector area 120 consists of one data sector or a plurality of data sectors.

The servo areas 110 are spaced apart equidistantly spaced part from one another, each extending over the tracks and in the radial direction of the disk 1. Generally, 50 to 60 servo areas 110 are provided on a disk. In the HDD according to the invention, shown in FIG. 1, 56 servo areas 110 are provided on the disk 1, and 56 servo sectors 100 are provided in the 56 servo areas 110, respectively. Servo-sector addresses 0 to 55 are assigned to the 56 servo sectors. Each of these servo-sector addresses consists of six bits 0 to 5.

Figure 3:
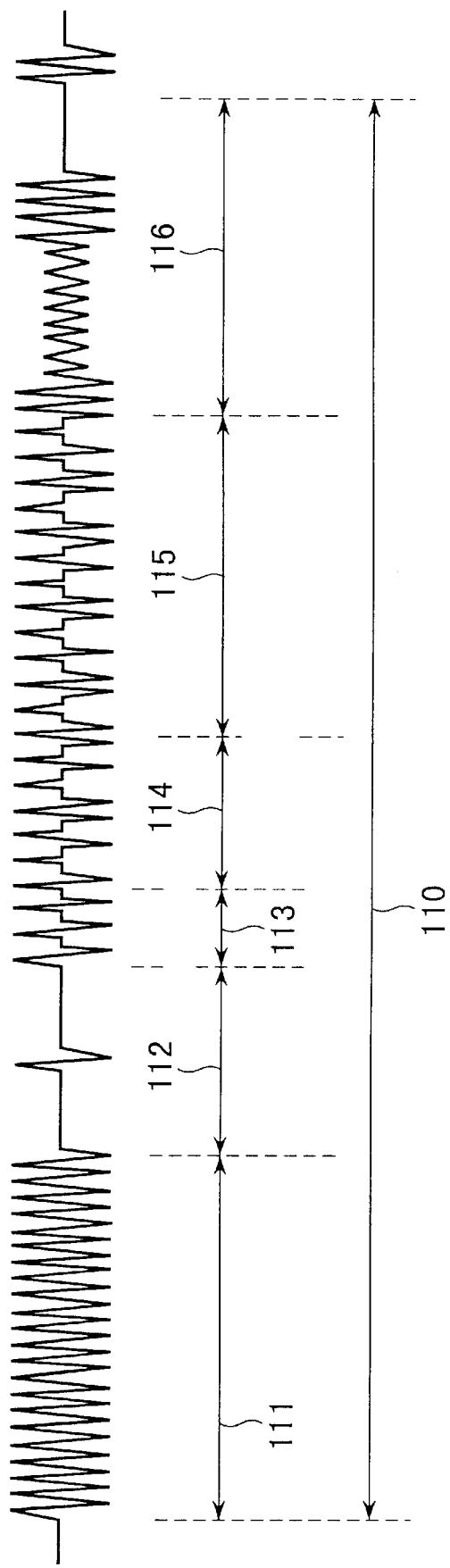
FIG. 3 is a diagram illustrating the format of the disk and also the waveform of servo data.

Each servo area 110 has the format illustrated in FIG. 3. FIG. 3 shows not only the format of the servo area 110, but also the waveform that corresponds to the servo data recorded in the servo area 110. The servo area 110 has an AGC (Auto Gain Control) section 111, an erase section 112, an index section 113, a sector-address section 114, a cylinder-address section 115, and a burst section 116. A signal of a prescribed frequency is recorded in the AGC section 111 to stabilize other signals. An index pattern is recorded in the index section 113 to identify the servo area 110. A servo-sector address is recorded in the sector-address section 114. A cylinder address is recorded in the cylinder-address section 115. Servo-burst data is recorded in the burst section 116.

The servo-sector address is a servo-sector number that designates the position in the cylinder, where the servo sector 100 is provided. The cylinder address is a cylinder number that designates the position of the cylinder. The servo-burst data is a burst pattern indicating a position error in the cylinder (i.e., track), as the amplitude of the waveform that corresponds to the servo data recorded in the servo area 110.

As shown in FIG. 1, the HDD comprises a spindle motor (SPM) 3, an actuator 4, a voice coil motor (VCM) 5, a motor driver IC 6, an head amplifier circuit 7, a head/write channel 8, a gate array 9, an HDC (Hard Disk Controller) 10, a buffer memory 11, and a CPU 12. The SPM 3 rotates the disk 1. The actuator 4 holds the heads 2. When driven by the VCM 5, the actuator 4 moves the heads 2 in the radial direction of the disk 1. Both the SPM 3 and the VCM 5 are connected to the motor driver IC 6. The motor driver IC 6 incorporates a VCM driver 6A and an SPM driver 6B. The CPU 12 controls the drivers 6A and 6B.

The heads 2 are connected to the head amplifier circuit 7. The head amplifier circuit 7 is provided in a flexible printed circuit FPC (not shown, to switch one head 2 to the other and to input write signals to the heads 2 and output read signals therefrom. The head amplifier circuit 7 has a read amplifier, a write amplifier, and a bias current generator. The read amplifier amplifies the read signals (reproduced analog output) which the heads 2 have read from the disk 1. The write amplifier outputs the write signals (write currents) to the heads 2, in accordance with the write data supplied from the head/write channel 8. The bias current generator supplies a bias current to the read head of each head 2.

The read/write channel 8 is a circuit designed to process the data that either head 2 has read from the disk 1 and also the data either head 2 is to write on the disk 1. The channel 8 has an AGC (Automatic Gain Control) circuit, a decoder circuit, a servo circuit, and an encoder circuit. The AGC circuit receives a read signal from the head amplifier circuit 7 and amplifies the read signal. A desired amplitude is thereby imparted to the signal contained in the read signal and read from the AGC section 111 of the servo area 110. The decoder circuit decodes the read signal amplified by the AGC circuit, thereby generating, for example, an NRZ code. The servo circuit extracts the servo data from the read signal. The encoder circuit modulates the write data transferred from the HDC 10 in the form of an NRZ code.

The gate array 9 detects the index pattern recorded in the index section 113 of the servo area 110, from the servo data (i.e., read pulses) which the read/write channel 8 has extracted. The gate array 9 can generate various timing signals. Some of the timing signals generated by the array 9 are used to extract data items from the sector-address section 114, cylinder-address section 115 and burst section 116 of the servo area 110. Some others of the timing signals generated by the array 9 are used to write data in, and read data from, the data sectors in the data-sector area 120 that follows the servo area 110. Further, the gate array 9 can extract the servo-sector address and cylinder address, respectively from the sector-address section 114 and cylinder-address section 115. Both the servo-sector address and the cylinder address have been generated from the read pulses.

The HDC 10 functions as an interface for controlling the transfer of commands and read/write data between the HDD and a host system (e.g., a personal computer). The HDC 10 functions also as a disk controller, controlling the transfer of the read/write data between it and the read/write channel 8, in accordance with the timing signal supplied from the gate array 9.

During the reading operation, the HDC 10 transfers to the hose system the data reproduced from the target data sector and output from the read/write channel 8. The HDC 10 controls the buffer memory (RAM) 11, whereby the read/write data is temporarily stored in the buffer memory 11. Thus, the HDC 10 controls the transfer of data. Moreover, the HDC 10 performs a so-called disk-cache function, by utilizing the buffer memory 11.

The CPU 12 is a micro-controller that constitutes the main control section of the HDD. The CPU 12 incorporates a flash ROM (Read Only Memory) 13, i.e., a nonvolatile memory in which data can be written. The flash ROM 13 (hereinafter referred to as "FROM") stores a control program 130 for controlling the CPU 12. The FROM 13 also stores a sector-address back translation table 131.

As will be described later, the servo-sector addresses recorded in the servo sectors 110 on the same cylinder provided on the disk 1 have been translated to randomized addresses (i.e., addresses not sequentially arranged in the initial order). That is, the servo-sector addresses were randomized and recorded when a servo writer recorded the servo data on the disk 1 during the manufacture of the HDD. The sector-address back translation table 131 shows which randomized address corresponds to which original servo-sector address. The table 131 is used to convert the randomized servo-sector addresses to the original servo-sector addresses, respectively.

The CPU 12 uses the cylinder address and the servo burst data, both read by the head 2, processed by the read/write channel 8 and extracted by the gate array 9, thereby to move the head 2 to the target cylinder (i.e., the track on the disk 1, which is to be accessed). Upon receipt of the read/write command from the host system, the CPU 12 set parameters in the read/write channel 8 and performs read/write control on the HDC 10. The HDC 10 can therefore control the timing of reading data from the target sector and the timing of writing data in the target sector. The CPU 12 translates the servo-sector addresses extracted by the gate array 9, back to the original addresses, on the basis of the sector-address back translation table 131. The CPU 12 checks the continuity of the servo-sector addresses specific to the consecutive servo sectors including the target servo sector, after all servo-sector addresses have been translated, each back to the original address.

The CPU 12 then determines whether the servo-sector addresses read are correct or not. (In other words, the CPU 12 detects address errors, if any.)

(Operation of the HDD)

First, the read head (i.e., MR head) of the head 2 reads the servo data from the servo area 110 provided in a servo sector 100 of the disk 1, and also the user data from each data sector provided in a data-sector area 120. The head amplifier circuit 7 amplifies the read signal, i.e., the output of the read head. The read signal amplified is supplied to the read/write channel 8.

The AGC circuit incorporated in the read/write channel 8 adjusts the gain of the amplifier 8 so that the signal read from the ACG section 111 of the servo area 110 and contained in the signal amplified by the head amplifier circuit 7 may have a constant amplitude. The read/write channel 8 also performs binarization, translating the read signal to a train of read pulses. The read pulses are output to the gate array 9.

The gate array 9 receives the read pulses and detects the index pattern recorded in the index section 113 of the servo area 110. The gate array 9 generates a servo-sector pulse that indicates the timing of detecting the index pattern. The gate array 9 also generates a burst-timing signal (burst timing signal) for the servo burst data recorded in the burst section 116 of the servo area 110, on the basis of the servo-sector pulse. Further, the gate array 9 generates two timing signals (address-timing signals) for the sector-address section 114 and cylinder-address section 115 of the servo area 110, respectively. The burst-timing signal is output to the read/write channel 8.

In response to the burst-timing signal output from the gate array 9, the read/write channel 8 extracts the servo burst data from the read signal now having a stabilized amplitude. In response to the address-timing signals it has generated, the gate array 9 extracts, from the read pulses, the servo-sector address and cylinder address which are recorded respectively in the sector-address section 114 and cylinder-address section 115. The gate array 9 generates data-sector pulses indicating the positions of the data sectors in a data-sector area 120 of the servo sector 100 which has been designated by the servo-sector address extracted. The gate array 9 compares the servo-sector address with the servo-sector address designating the target data sector, i.e., the data sector to be accessed. The gate array 9 counts the data-sector pulses, thus detecting the position of the data sector at which the operation of reading data from or writing data in the target servo sector is to be started. The timing of the reading or writing operation is thereby controlled in the HDC 10.

Every time the gate array 9 extracts the address of the cylinder at which the head 2 is located, the CPU 12 compares this cylinder address with the address of the target cylinder. From the difference between the addresses compared, the CPU 12 calculates the distance the head 2 should be moved to reach the target cylinder. The data representing the distance is supplied to the motor driver IC 6. In accordance with this data the motor driver IC 6 drives the VCM 5, which moves the head 2 to the target cylinder. Thereafter, every time the read/write channel 8 extracts servo burst data, the CPU 12 calculates, from the servo burst data, a position error of the head 2, i.e., the distance between the head 2 and the target position in the target cylinder. In accordance with the position error the motor driver IC 6 drives the VCM 5, whereby the head 2 is moved to the target position in the target cylinder.

As can be understood from the above, the address signals recorded in the sector-address section 114 and cylinder-address section 115 of the servo area 110 differ from each other. They depend on the positions the sections 114 and 115 take in the servo area 110. From the address signals it can therefore be determined where the head 2 is located over the disk 1. In the present embodiment, the address signals recorded on the address sections 114 and 115 have the waveform shown in FIG. 4A. Each address signal is sampled at regular intervals, thereby generating a train of read pulses shown in FIG. 4B, each having a logic value "1" or "0." Every three consecutive read pulses make a set. The left set shown in FIG. 4B has value "1," and the right set shown in FIG. 4B has value "0." These values "1" and "0" (i.e., addresses) can be extracted by the gate array 9, distinguished from each other.

The values "10" and "0" may not be distinguished from each other if the address signal the head 2 has reproduced is superimposed with noise. If this happens, the gate array 9 will extract a wrong address, making it difficult to move the head 2 at the desired position. In the worst case, the head 2 will write data at a position other than the target position, inevitably destroying the data recorded at that position.

As indicated above, the head 2 is moved to the target cylinder by using not only the address of the target cylinder, but also the data (burst data) recorded in the burst section 116. Unless a cylinder address identical to the address of the target cylinder is extracted the head 2 cannot read data from or write data in the target cylinder. It is therefore relatively easy to detect, if any, a position error of the head 2 with respect to the target cylinder. By contrast, it is difficult to detect a position error with respect to the target servo sector. This is because the address patterns of all servo sector are obtained every time the disk 1 rotates through 360°.

The addresses of the servo sectors 100 are obtained in the very order the sectors 100 are arranged on the disk 1. Hence, a position error with respect to the target servo sector may be detected by checking the continuity of the servo-sector addresses as has been practiced hitherto. More precisely, to access to the data sector designated by the servo-sector address "38," it is determined whether the three addresses preceding this address are "35," "36" and "37" or not. Unless these three addresses precede the address "38," no access to the data sector designated by the address "38" is allowed. It is the CPU 12 that checks the continuity of servo-sector addresses. The checking of the continuity of servo-sector addresses is a method of determining the authenticity of servo-sector addresses, which proves very effective when the read signals are influenced by random noise.

When the read signals are influenced by Barkhausen noise (BHN) that MR heads may generate, however, the authenticity of any servo-sector address cannot be determined by only checking the continuity of the servo-sector addresses. It has been recognized that Barkhausen noise often, not to say always, appears at specific positions of the signal waveform of an address signal.

(Detection of Error in the Servo-Sector Address)

It will be now described how an error, if any, is detected in the servo-sector addresses, or how the authenticity of the addresses is determined in the present embodiment.

In this embodiment, each servo-sector address is composed of six bits as is illustrated in FIG. 5A. Assume that an error occurs at bit 5 (i.e., the most significant bit) of every servo-sector address, changing the value of bit 5, for example, from "0" to "1" as illustrated in FIG. 5B. Then, each address designates the thirty-second data sector ahead. Nonetheless, the order in which the addresses are arranged remains unchanged. It is therefore impossible to detect the error in each servo-sector address even if the continuity of addresses is checked.

As shown in FIG. 5A, the servo-sector address are "3," "4" and "5." When an error occurs at bit 5 of each of these addresses, changing the bit 5 from "0" to "1," the addresses "3," "4" and "5" change to addresses "35," "36" and "37," respectively. In this case, data will be recorded in the data sector designated by the address "6," though it should be recorded in the data sector designated by the address "38."

In order to detect the error in each servo-sector address reliably, thereby to prevent data from being recorded in a wrong data sector, the addresses recorded in the 56 servo sectors 100 (more correctly, 56 servo areas 110) arranged in each cylinder are changed to addresses which have no continuity. In other words, the servo-sector addresses are randomized. If an error occurs at bit 5 of each of the servo-sector addresses thus randomized, changing the bit 5 in logic value, the address will change differently, not to consecutive ones. Since the servo-sector addresses have no longer continuity. An error, if any, can be reliably detected in each servo-sector address. Thus, a wrong data sector can be prevented from being accessed.

Of the address data recorded in each servo sector 100, the servo-sector address may be recorded on the disk 1 during the manufacture of the HDD. This is called "hard sector method." Alternatively, the servo-sector address may be recorded on the disk 1 (in a formatting mode) after the manufacture of the HDD, before other data is recorded on the disk 1. This is called "soft sector method." A servo-sector address is contained in servo data recorded on the disk 1 by a so-called servo writer. The servo data is recorded in the format illustrated in FIG. 3. (See FIG. 2 for the arrangement of the servo areas 110.)

The servo-sector addresses are randomized by using random numbers (including pseudo-random numbers). This method of randomizing the servo-sector addresses enhances the probability of detecting an error, if any, in each servo-sector address.

The random number used as a servo-sector address may be generated before it is recorded or accessed, if it is identical in either case. It is desired, nonetheless, that a table showing the consecutive servo-sector addresses (original addresses) and the random addresses (translates) corresponding to the consecutive addresses be stored in a non-volatile semiconductor memory. By the use of the table it is possible to convert the consecutive addresses to the random addresses, and vice versa. This translation of servo-sector addresses can be achieved at high speed.

Basically, the random numbers may be of any type available. However, those very similar to binary codes do not always work efficiently. The inter-code distance (i.e., the number of bits of a code which differ in value from the corresponding bits of the immediately adjacent code) should better be long so that the addresses of the adjacent servo sectors 100 may differ very much. Further, the inter-code distance between each servo-sector address and the second immediately adjacent code should better be large since the continuity of servo-sector addresses is checked, usually for at least three servo sectors. Moreover, the servo-sector addresses should not be generated on the basis of a specific rule. The servo-sector addresses will otherwise maintain continuity even if an error occurs at a specific bit of each servo-sector address.

As mentioned above, the random numbers may be of any type available. Generally, random numbers are not generated on the basis of whatever rule. Nonetheless, inter-code distances are seldom imparted to random numbers. If inter-code distances are imparted to random numbers, it will suffice to find the inter-code distance between each adjacent servo-sector address and the immediately adjacent one (and, also the inter-code distance between the servo-sector address and the second immediately adjacent code), and to select the largest one.

Such random numbers for servo-sector addresses have been generated by means of a computer, preparing a sector address translation table 132 shown in FIGS. 6 and 7. This table shows the servo-sector addresses (original addresses) and the random numbers (translates) corresponding to the servo-sector addresses. The random numbers are used to convert the servo-sector addresses to ones that have not continuity. In FIGS. 6 and 7, "code (H)" and "code (B)" denote a hexadecimal code and a binary code, respectively. "CD1" is the inter-code distance between two adjacent addresses, whereas "CD2" is the inter-code distance between an address and the second immediately adjacent address.

More specifically, the servo writer writes the servo-sector addresses in the sector-address sections 114 of the servo area 110 of each servo sector 100 on the disk 1 during the manufacture of the HDD. In the process of writing the servo-sector addresses, the translation table 132 (FIGS. 6 and 7) is referred to. That is, the addresses translated on the basis of the table 132 are sequentially written at the positions of the original addresses. More precisely, servo-sector addresses "42," "6," "17," "10," . . . "13, " "23," "2" and "37" are written in the sector-address sections 114 for the original servo-sector addresses "3," "4," "5," "6," . . . "35," "36," "37" and "38," respectively, as is illustrated in FIGS. 6 and 7.

Therefore, to access the disk 1 it suffices to convert the addresses extracted by the gate array 9 back to the original servo-sector addresses, by means of, for example, the CPU 12. This back translation of addresses can be achieved by the use of the translation table 132 shown in FIGS. 6 and 7. The table 132 is suitable for translating the original addresses to random numbers since the random numbers are sorted in accordance with the original addresses. However, the table 132 is not optimal for the back translation.

Therefore, the translated addresses in the table 132 are sorted, preparing a back translation table 131 shown in FIGS. 8 and 9. The table 131 shows the translated addresses, thus sorted, and the original addresses corresponding to the translated addresses. The back translation table 131 is stored into the FROM 13 shown in FIG. 1. The CPU 12 refers to the table 131, translating any translated address extracted by the gate array 9, back to the original address.

In the present embodiment employing the hard sector method, the sector address translation table 132 is used, only during the manufacture of the HDD. Hence, there is no need to record the table 132 in the HDD, provided that the back translation table 131 is stored in the FROM 13.

Assume that the servo-sector addresses (original addresses) that should be recorded in the sector-address sections 114 of the servo area 110 of each servo sector 100 are such consecutive ones as shown in FIG. 10A. During the manufacture of the HDD, the servo-sector addresses are randomized in accordance with the sector address translation table 132 shown in FIGS. 6 and 7, generating translated addresses shown in FIG. 10B, which have no continuity at all. The translated addresses are assigned to the servo sectors. As can be understood from FIG. 10B, the translated servo-sector addresses are random (not consecutive), unlike the original servo-sector addresses.

In the HDD having the disk 1 on which the translated servo-sector addresses are assigned to the servo sectors, Barkhausen noise may regularly appears at a specific position of the waveform of a signal read by the read head (MR head), for example, at bit 5 of the servo-sector address recorded in each sector-address section 114. If this happens, the servo-sector addresses extracted by the gate array 9 and read by the CPU 12 will change to those shown in FIG. 10C. Namely, each servo-sector address will change at bit 5, i.e., the most significant bit. Nonetheless, the addresses shown in FIG. 10C remain not continuous as before.

After reading the servo-sector address extracted by the gate array 9, the CPU 12 refers to the back translation table 131 stored in the FROM 13, by using the servo-sector address as the key. That is, the CPU 12 translates the translated servo-sector addresses back to the original ones, as is illustrated in FIG. 10D. As seen from FIG. 10D, the original addresses no longer have the continuity they had as shown in FIG. 10A. Finding this fact, the CPU 12 determines that error have occurred in the servo-sector addresses which have been read by the read head and extracted by the gate array 9 via the read/write channel 8.

Figure 11:
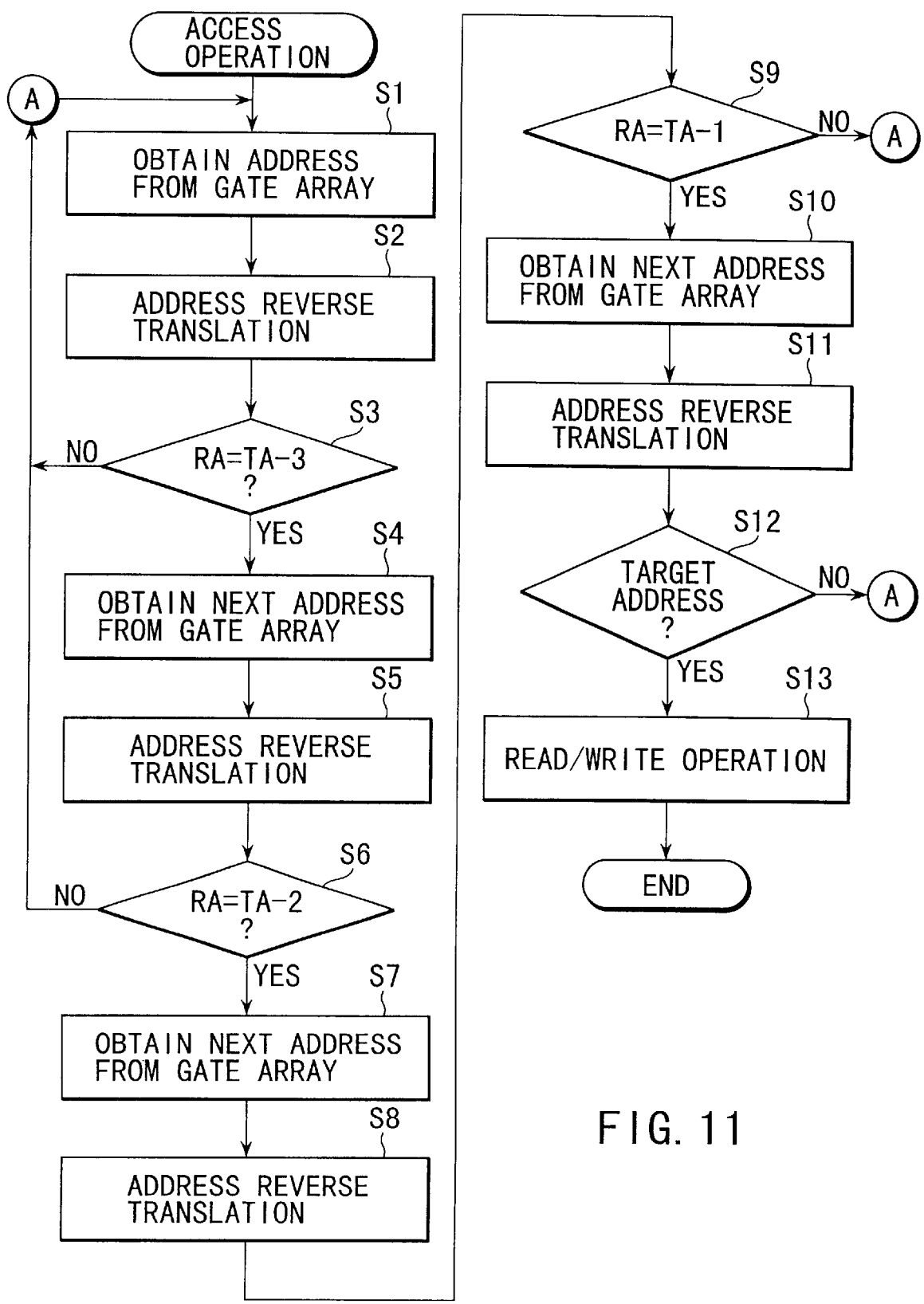
FIG. 11 is a flow chart explaining the sequence of checking the continuity of servo-sector addresses in the disk drive.

How four consecutive servo-sector addresses (original addresses), including the target servo-sector address, are checked for their continuity will be described, with reference to the flow chart of FIG. 11.

At first, the CPU 12 reads a servo-sector address extracted by the gate array 9 (Step S1). The CPU 12 then refers to the back translation table 131 stored in the FROM 13, by using the addresses as keys, and translates the address (translated) to the original address (Step S2). The CPU 12 determines whether the servo-sector address (back-translated) RA is the address three addresses before the target servo-sector address (TA) (Step S3). In other word, the CPU 12 determines whether RA is (TA−3) The CPU repeats Steps S1 to S3 until it detects the servo-sector address (RA=TA−3).

Upon detecting the servo-sector address (RA=TA−3), the CPU 12 reads the next servo-sector address which the gate array 9 has extracted from the next servo sector 100 (Step S4). The CPU 12 then translates this servo-sector address (translated) back to the original servo-sector address (Step S5). Further, the CPU 12 determines whether the servo-sector address RA (back-translated) is the address two addresses before the target servo-sector address (TA) (Step S6). In other word, the CPU 12 determines whether RA is (TA−2). If NO in Step S6, the CPU 12 determines that the servo-sector address is not consecutive to the preceding one and that an error has occurred in the first servo-sector address (back-translated).

If YES in Step S6, the CPU 12 reads the second next servo-sector address which the gate array 9 has extracted (Step S7). The CPU 12 then translates the second next address back to the original servo-sector address (Step S8). The CPU 12 determines whether the second servo-sector address (back-translated) RA is the address immediately preceding the target servo-sector address (TA) (Step S9). That is, the CPU 12 determines whether RA is (TA−1). If NO in Step S9, the CPU 12 determines that the servo-sector address is not consecutive to the preceding one and that an error has occurred in the second address (back-translated).

If YES in Step S9, the CPU 12 reads the third next translated servo-sector address which the gate array 9 has extracted (Step S10). The CPU 12 translates the third next address back to the original servo-sector address (Step S11). The CPU 12 then determines whether the third address RA (back-translated) is the target servo-sector address (TA) or not (Step S12). That is, the CPU 12 determines whether RA is TA. If NO in Step S9, the CPU 12 determines that the four servo-sector addresses reproduced from the four servo sectors (the first of which is the target sector 3) are not consecutive ones and that an error has occurred in the third address (back-translated).

If YES in Step S9, the CPU 12 determines that the four servo-sector addresses reproduced from the four servo sectors are consecutive ones and that no error has occurred in the target address (back-translated). The CPU 12 then performs read/write operation on the target data sector in the servo sector 100 (Step S13).

The embodiment described above is an HDD that employs the hard sector method. Nevertheless, the present invention can be applied to an HDD that employs the soft sector method. In the HDD utilizing the soft sector method, the write head records servo-sector addresses on the disk 1 under the control of the CPU 12, in accordance with the user's instructions after the manufacture of the HDD.

To write the servo-sector addresses on the disk 1, they must be translated. The translation of the addresses can indeed be accomplished by using the back translation table 131 shown in FIGS. 8 and 9. It is, however, more desirable to use the translation table 132 illustrated in FIGS. 6 and 7. To use the table 132, the table 132 needs to be stored into the FROM 13, along with the back translation table 131.

Figure 12:
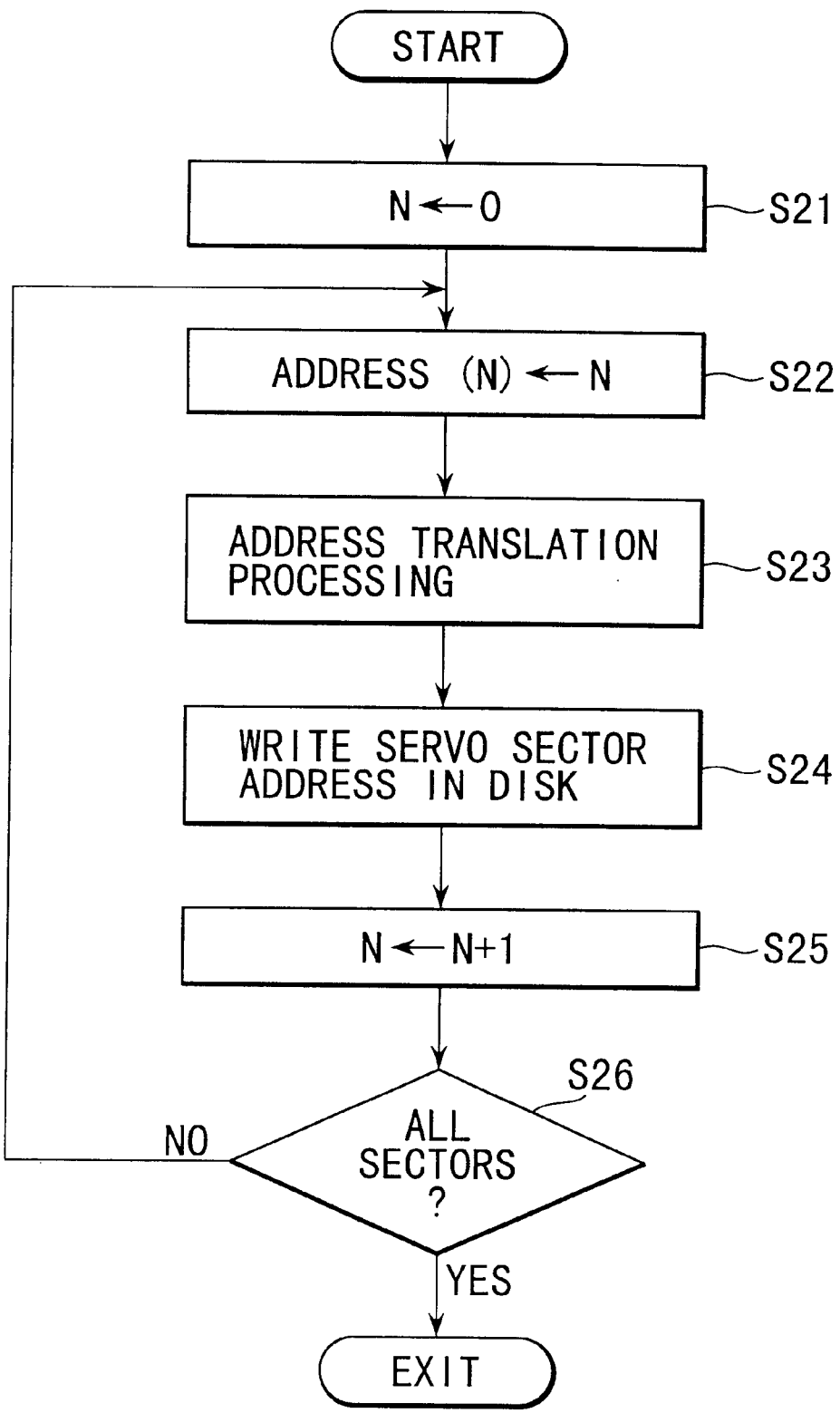
FIG. 12 is a flow chart explaining the sequence of writing servo-sector addresses in the disk drive.

The sequence of writing the servo-sector address in the sector address sections 114 of each servo sector 100 in a certain cylinder will be explained below, with reference to the flow chart of FIG. 12.

First, the CPU 12 set a variable (N) at initial value of "0" (Step S21). The CPU 12 uses the present value of the variable (N) as a servo-sector address (Step S22). The CPU 12 then refers to the translation table 132 (FIGS. 6 and 7), by using the address (N) as the key, and translates the servo-sector address to the corresponding one shown in the translation table 132 (Step S23).

Next, the CPU 12 writes the servo-sector address (translated) at a prescribed position in the Nth servo sector 100 of the cylinder (Step S24). More precisely, the prescribed position is the head of the data-sector area 120 of the Nth servo sector 100, unlike in the hard sector method.

The CPU 12 increases the variable (N) by one (Step S25). The CPU 12 then repeats Steps S22 to S25 until all serve-sector addresses (translated) are written on the disk 1 (Step S26).

The back translation table 131 (as well as the translation table 132) may be stored in any nonvolatile storage means other than the FROM 13. For instance, the table 131 may be stored in a special area (generally called "system area") on the disk 1, which the user can have no access to. If the back translation table 131 (as well as the translation table 132) is stored in the special area on the disk 1, it (as well as the table 132) can be read from the disk 1 into the RAM 11 under the control of the CPU 12 and can therefore be fast referred to.

The embodiment described above is an HDD in which the read head is an MR (or a GMR head). The present invention is not limited to HDDs. Rather, the invention can be applied also to any disk drive other than HDDs, in which a read head reproduces sector addresses. To be more specific, the invention can be applied to an optical disk drive and the like. The read head may be one other than an MR head and a GMR head, except for the case where a reading error regularly occurs at a specific bit of each sector address.

As has been described above in detail, the sector addresses recorded on the same cylinder provided on the disk are translated to randomized ones, i.e., sector addresses not sequentially arranged in the initial order, in accordance with the prescribed rule. To reproduce the sector addresses, the sector addresses thus randomized are translated back to the original sector addresses in accordance with the prescribed back translation rule. Hence, if noise influences the read signal, causing an error at the specific bit of each sector address, the error can be reliably detected by checking the continuity of the sector addresses. In other words, the authenticity of the sector addresses can be determined. This prevents data from being recorded in a wrong data sector designated by an incorrect sector address.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
    a disk on which a plurality of concentric cylinders are provided, each cylinder having servo sectors equidistantly arranged in circumferential direction of the cylinder, servo sectors including at least one data sector each and respectively having sector addresses recorded and randomized in accordance with specific translation rule;
    a head for reading the sector addresses from the servo sectors provided and reading and writing data from and in the data sectors;
    address generating means for translating the sector addresses read from the servo sectors by the head, back to the sector addresses specific to the servo sectors; and
    read/write means for designating a target servo sector by using the sector address of the target servo sector and causing the head to read and write data from and in the data sector provided in the target servo sector.

2. A disk drive according to claim 1, wherein the sector addresses are randomized such that at least two or three adjacent servo sectors are arranged in an random order in the same cylinder.

3. A disk drive according to claim 1, further comprising error detecting means for checking continuity of the sector addresses generated by the address generating means and being specific to the servo sectors including the target servo sector, thereby to detect errors in the sector addresses.

4. A disk drive according to claim 1, wherein a sector address and a cylinder address for identifying the cylinder are recorded in each servo sector, and only the sector address recorded in each servo sector is randomized in accordance with the specific translation rule.

5. A disk drive according to claim 1, further comprising sector address recording means for randomizing the sector address of each servo sector in accordance with the specific translation rule and then recording the sector address, thus randomized, in the servo sector.

6. A disk drive according to claim 1, wherein the specific translation rule uses random numbers or pseudo random numbers.

7. A disk drive according to claim 6, wherein the random numbers or pseudo random numbers represent translated sector addresses, each consisting of a prescribed number of bits and being different from an immediately adjacent translated sector address at as many bits as possible.

8. A disk drive according to claim 6, wherein the random numbers or pseudo random numbers represent translated sector addresses, each consisting of a prescribed number of bits and being different from two immediately adjacent translated sector addresses at as many bits as possible.

9. A disk drive according to claim 1, wherein the address generating means has a nonvolatile memory storing a back translation table and refers to the back translation table, translating the sector addresses read by the head from the servo sectors provided on the disk, back to the servo addresses specific to the servo sectors.

10. A method of accessing a sector in a disk drive comprising: a disk on which a plurality of concentric cylinders are provided, each cylinder having servo sectors equidistantly arranged in circumferential direction of the cylinder, servo sectors including at least one data sector each and respectively having sector addresses recorded and randomized in accordance with specific translation rule; and a head for reading the sector addresses from the servo sectors provided and reading and writing data from and in the data sectors, said method comprising the steps of:

reading the sector addresses from the disk by means of the head; and translating the sector addresses read from the disk, back to the sector addresses specific to the servo sectors and not randomized in accordance with specific translation rule.

11. A method according to claim 10, further comprising a step of determining whether the sector addresses have errors, by checking continuity of the sector addresses generated in the step of translating the sector addresses back to the sector addresses.

12. A method according to claim 11, further comprising a step of specifying a target data sector on the basis of a sector address that has been found to have no errors in the step of determining whether the sector addresses have errors, and reading and writing data from and in the data sector specified, by means of the head.

* * * * *